US008636613B2

(12) United States Patent
Teslak et al.

(10) Patent No.: US 8,636,613 B2
(45) Date of Patent: Jan. 28, 2014

(54) CLUTCH TORQUE TRAJECTORY CORRECTION TO PROVIDE TORQUE HOLE FILLING DURING A RATIO UPSHIFT

(75) Inventors: Christopher John Teslak, Plymouth, MI (US); Gregory Michael Pietron, Canton, MI (US); Hongtei Eric Tseng, Canton, MI (US); Yuji Fujii, Ann Arbor, MI (US); Michael Glenn Fodor, Dearborn, MI (US); Diana Yanakiev, Birmingham, MI (US); Seung-Hoon Lee, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 13/330,120

(22) Filed: Dec. 19, 2011

(65) Prior Publication Data

US 2013/0153353 A1  Jun. 20, 2013

(51) Int. Cl.
*F16H 31/00* (2006.01)

(52) U.S. Cl.
USPC .......................................................... 475/125

(58) Field of Classification Search
USPC .......................................... 475/125, 127, 266
See application file for complete search history.

(56) References Cited

U.S. PATENT DOCUMENTS

| | | |
|---|---|---|
| 4,220,058 A | 9/1980 | Petzold |
| 4,724,723 A | 2/1988 | Lockhart et al. |
| 4,744,031 A | 5/1988 | Takeda et al. |
| 4,790,418 A | 12/1988 | Brown et al. |
| 4,792,902 A | 12/1988 | Hrovat et al. |
| 4,855,914 A | 8/1989 | Davis et al. |
| 5,058,015 A | 10/1991 | Leorat |
| 5,092,182 A | 3/1992 | Ikeda et al. |
| 5,105,357 A | 4/1992 | Steeby |
| 5,133,227 A | 7/1992 | Iwatsuki |
| 5,165,286 A | 11/1992 | Hamamura et al. |
| 5,188,005 A | 2/1993 | Sankpal et al. |
| 5,669,851 A | 9/1997 | Tietze |
| 5,839,987 A | 11/1998 | Sawamura et al. |
| 6,278,926 B1 | 8/2001 | Jain et al. |
| 6,482,125 B2 | 11/2002 | Urasawa |
| 6,698,299 B2 | 3/2004 | Cripe |
| 6,832,976 B2 * | 12/2004 | Nishida et al. ................ 477/120 |
| 6,846,260 B2 | 1/2005 | Horiuchi |
| 6,949,051 B2 | 9/2005 | Katakura |
| 6,991,584 B2 | 1/2006 | Cowan |
| 7,178,618 B2 | 2/2007 | Komeda et al. |

(Continued)

OTHER PUBLICATIONS

Office Action dated Jun. 12, 2013 for U.S. Appl. No. 13/155,867, filed Jun. 8, 2011, pp. 1-6.

*Primary Examiner* — Edwin A Young
(74) *Attorney, Agent, or Firm* — James Dottavio; Brooks Kushman P.C.

(57) ABSTRACT

A multiple ratio transmission having an input shaft, an output shaft and oncoming clutch and off-going clutch for effecting ratio upshifts is provided. The transmission also includes a transmission controller configured for controlling shifts. During the torque phase of a ratio upshift, the controller increases input torque. Next, the controller estimates an oncoming clutch target torque. The controller controls a torque input to ensure the off-going clutch remains locked. The controller measures an actual transmission value for a torque transmitting element of the transmission and corrects the oncoming clutch target torque using the actual transmission value whereby an increasing torque for the oncoming friction element is achieved with minimal torque transients along the output shaft during the upshift.

20 Claims, 9 Drawing Sheets

(56) References Cited

U.S. PATENT DOCUMENTS

| | | |
|---|---|---|
| 7,243,557 B2 | 7/2007 | May |
| 7,300,381 B2 | 11/2007 | Badillo et al. |
| 7,351,183 B2 | 4/2008 | Fujii et al. |
| 7,478,572 B2 | 1/2009 | Maten et al. |
| 7,503,875 B2 * | 3/2009 | Fujii et al. .................. 477/107 |
| 7,698,041 B2 * | 4/2010 | Streib ........................ 701/51 |
| 8,290,668 B2 | 10/2012 | Hirasako et al. |
| 2002/0025885 A1 | 2/2002 | Saito et al. |
| 2004/0214687 A1 | 10/2004 | Morisawa et al. |
| 2004/0242374 A1 | 12/2004 | Wheals |
| 2006/0135316 A1 | 6/2006 | Fujii et al. |
| 2008/0139362 A1 | 6/2008 | Fujii et al. |
| 2010/0318269 A1 | 12/2010 | Yanakiev et al. |
| 2011/0184612 A1 | 7/2011 | Fujii et al. |
| 2012/0130608 A1 | 5/2012 | Fujii et al. |
| 2012/0130610 A1 | 5/2012 | Lee et al. |

\* cited by examiner

CLUTCH TORQUE TRAJECTORY CORRECTION TO PROVIDE TORQUE HOLE FILLING DURING A RATIO UPSHIFT

TECHNICAL FIELD

The present disclosure relates to a system and method to control speed-ratio upshifts in an automatic vehicle transmission for achieving reduced transmission output shaft torque transients during an upshift.

BACKGROUND

Known automatic transmissions for automotive vehicles include step ratio controls for effecting speed ratio changes in response to changing driving conditions. The term "speed ratio", for purposes of this description, is defined as transmission input shaft speed divided by transmission output shaft speed.

A so-called speed ratio upshift occurs when the driving conditions require a ratio change from a lower ratio (high speed ratio) to a higher ratio (low speed ratio) in the transmission gearing. The gearing may include, for example, either a planetary type gear system or a lay shaft type gear system. An automatic gear ratio shift is achieved by friction torque establishing devices, such as multiple disk clutches and multiple disk brakes. The friction torque establishing devices include friction elements, such as multiple plate clutches and band brakes, which may be actuated hydraulically or mechanically.

A step-ratio automatic transmission uses multiple friction elements for automatic gear ratio shifting. A ratio change from a low gear ratio to a high gear ratio occurs in a synchronous clutch-to-clutch upshift as one friction element is engaged and a second friction element is disengaged. One friction element may be referred to as an off-going clutch (OGC). It is released while a second friction element, which may be referred to as an oncoming clutch (OCC), engages to create the upshift. The upshift event is divided into a preparatory phase, a torque phase and an inertia phase.

During the preparatory phase, a transmission controller reduces the OGC torque capacity to prepare for its release and simultaneously, adjusts the position of an OCC actuator to prepare for its engagement. During the torque phase, the controller increases the OCC torque capacity in a controlled manner while the OGC is still engaged or allowed to slip at a controlled slip rate. This causes torque that is transmitted through the OGC to drop significantly in accordance with an increase in torque capacity of the OCC. The controller may maintain enough OGC torque capacity to keep the OGC securely engaged or locked during the torque phase, which immediately follows the preparatory phase. Alternatively, the controller may allow the OGC to slip at a controlled rate.

During the torque phase of a conventional control system, torque transmitted through the OGC decreases when the transmission output shaft torque drops. This creates a so-called torque hole. A large torque hole can be perceived by the vehicle occupants as an unpleasant shift shock. The inertia phase begins when the OGC is released or has no significant torque capacity.

SUMMARY

Various embodiments of the present disclosure provide associated advantages. For example, various embodiments eliminate or reduce transient torque disturbances, such as the torque hole effect, during an upshift event. A transmission controller may provide estimated friction element torque targets using friction element actuator pressures in the case of a transmission control system with pressure operated actuators. In one embodiment, the controller executes control algorithms in a software control strategy without knowing actual torque profiles for the oncoming and off-going friction elements.

In a control system in one embodiment of the present disclosure, powertrain sensors may provide direct reading of operating variables, such as output torque. Torque sensors may be used, together with physical properties and functions of the transmission and driveline components, algorithms governing those functions and appropriate transfer functions, to provide accurate torque values for the oncoming and off-going clutches. The sensors provide torque feedback signals for correcting estimates of friction element torque in a closed loop fashion during calculations of actuator pressures.

The present disclosure includes a control strategy for coordinating the actuators to achieve minimal torque disturbance at the output shaft. The control strategy and associated algorithms may determine the desired clutch torque and assume, based on a clutch model, that this torque will be delivered using a calibrated transfer function between clutch pressure command and clutch torque. However, the clutch actuators are non-linear and their response to control pressures is affected by variables such as transmission oil temperature and other environmental factors. This can result in OCC torque transients or disturbances. Torque sensors may provide real time feedback of the actual clutch torques during an upshift.

The present disclosure describes a feedback control that uses one or more sensors (e.g., torque sensors) to develop an actual, real time sensor feedback (e.g., torque feedback) to calculate an oncoming friction element torque to ensure that the oncoming friction element torque tracks a target torque and to obtain a desired off-going friction element torque to ensure the off-going friction element remains locked as desired depending on the particular phase or progress of the shift. A torque sensor signal is used to calculate corrected oncoming and off-going friction element torque values as a direct torque measurement. For example, a torque sensor can be located at a transmission torque input shaft or at a transmission torque output shaft, or at both locations. Torque at other locations can be calculated using the direct readings for the sensors.

When the transmission input and output torques are known, the friction element torques can be calculated during the shift using a technique such as that disclosed in U.S. application Ser. No. 12/861,387, filed Aug. 23, 2010, which is assigned to the assignee of the present disclosure. Reference also may be made to U.S. Patent Publication 2010/0262344, filed Apr. 9, 2009, which also is assigned to the assignee of the present disclosure. Those references explain, for example, how to estimate the input shaft torque if only the output shaft torque is measured, and vice versa.

By knowing the friction element torques, performance and predictability of the algorithms can be improved because it is possible to determine if a friction element torque is actually achieved and to provide accurate modulation of the OCC actuator pressures so that torque transients at the OCC are minimized as the OGC remains locked. The target level of the OCC torque capacity is determined using governing equations to achieve a seamless output shaft torque transition from the torque phase of an upshift to an inertia phase.

A companion co-pending continuation-in-part patent application, which is assigned to the assignee of the present disclosure, discloses a control strategy for achieving a smooth upshift in a multiple ratio transmission without sensor feedback. The co-pending patent application is application Ser. No. 12/871,485, filed Aug. 30, 2010. The present application has some features that are common to that co-pending application.

A companion co-pending application, which is assigned to the assignee of the present disclosure, discloses a control strategy for achieving a smooth upshift in a multiple ratio transmission with sensor feedback in a lay shaft transmission, in particular where the OGC has a controlled slip during the torque phase. The co-pending application is application Ser. No. 13/155,867 filed Jun. 8, 2011.

BRIEF DESCRIPTION OF THE DRAWINGS

FIG. 1a is a schematic drawing of elements of the control system for controlling ratio shifts according to an embodiment of the present disclosure;

DETAILED DESCRIPTION

As required, detailed embodiments of the present disclosure are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
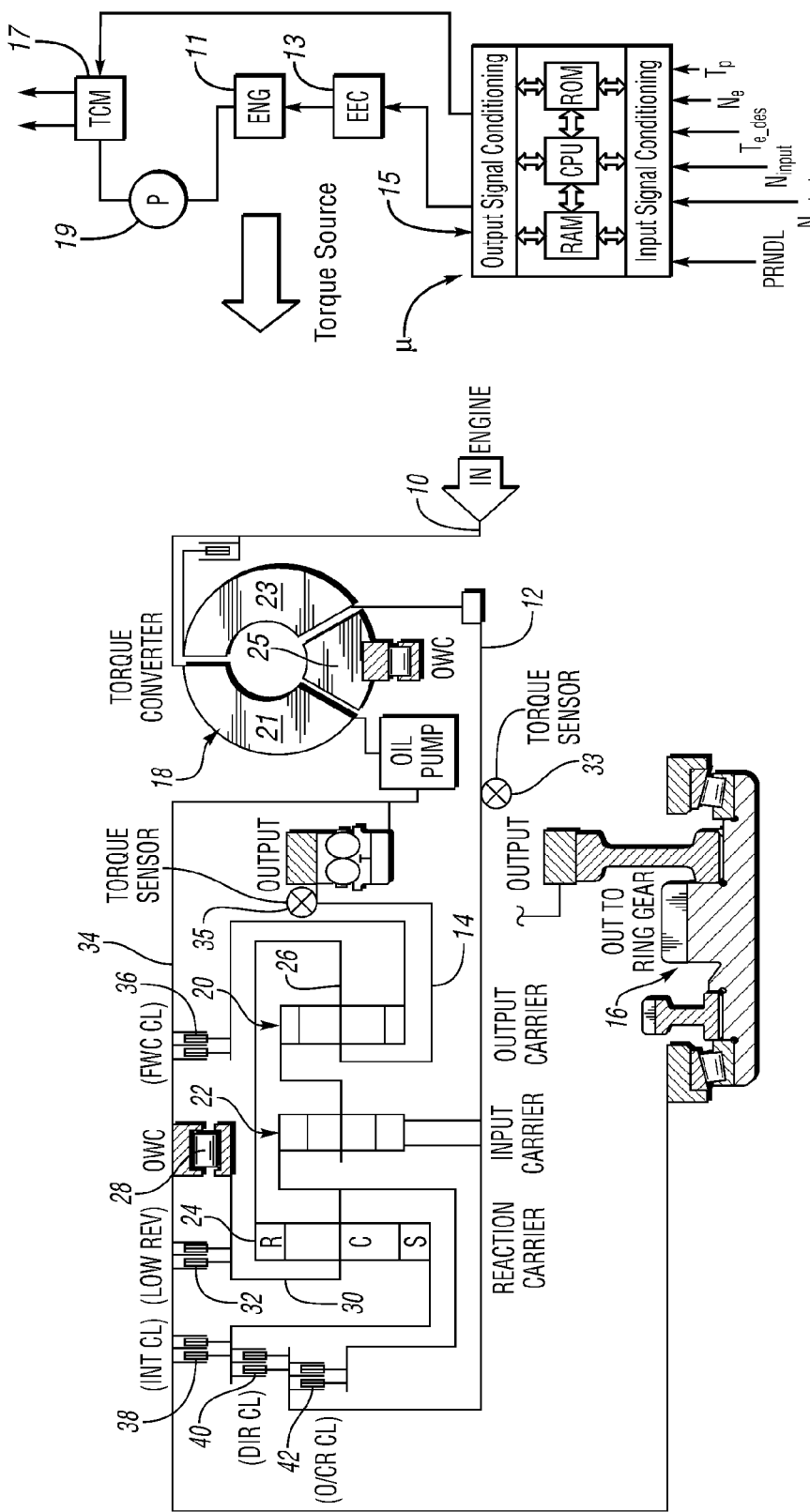
FIG. 1 is an example of a stepped ratio planetary automatic transmission according to an embodiment of the present disclosure.

FIG. 1 shows an example of a conventional planetary step-ratio automatic transmission. It comprises an engine driven torque input shaft 10 and a transmission input shaft 12. A transmission output shaft 14 delivers torque to transmission torque output gearing 16. A torque converter may be disposed between engine driven torque input shaft 10 and transmission input shaft 12, as shown at 18. A torque converter impeller 21 is in fluid flow relationship with respect to turbine 23. A stator 25 is disposed between the flow inlet section of impeller 21 and the flow exit section of turbine 23.

In the particular planetary transmission shown in FIG. 1, there are three simple planetary gear units 20, 22 and 24. Output torque is delivered from the carrier 26 to the torque output gearing. Carrier 26 is connected to the ring gear for gear unit 24 and to output shaft 14. An overrunning coupling 28 anchors the carrier 30 of planetary gear unit 24 against rotation in one direction, but freewheeling motion is provided in the opposite direction. During reverse drive and during low ratio operation, carrier 30 is braked by coupling 32 against the transmission housing 34. During forward drive operation, the sun gear for gear unit 20 is anchored to the housing through forward driving coupling 36.

During intermediate ratio operation, the sun gear for gear unit 24 is anchored to the housing 34 by intermediate coupling 38.

During direct drive, input shaft 12 is clutched by direct coupling 40 to input shaft 12, thus establishing a one-to-one driving ratio through the planetary gearing. Overdrive coupling 42, when engaged, directly connects the carrier for gear unit 24 and the ring gear for gear unit 22 to the input shaft 12. FIG. 1a shows an engine 11 which acts as a source of torque for the transmission. If the transmission has a torque converter, engine speed will equal speed of converter impeller 21 and transmission input speed will equal converter turbine speed.

Engine 11 is controlled by an electronic engine control (EEC) 13, which receives control signals from controller 15 based on multiple variables or driving condition data, such as engine throttle position, engine speed, desired engine torque, input and output speeds and a driver selected ratio range. A transmission control module 17 is also controlled by controller 15. A pump (P) 19, driven by the engine, supplies clutch and brake servo pressure to the transmission under the control of controller 15.

As previously mentioned, torque sensor embodiments of the present disclosure are used to obtain direct-reading oncoming and off-going clutch torques. In the case of the planetary transmission of FIG. 1, a torque sensor 33 may be located on torque input shaft 12. Likewise a torque sensor 35 may be located on torque output shaft 14. A measurement from the torque sensor 33 represents a sum of oncoming (OCC) and off-going clutch (OGC) torques when no significant inertia torque is present during a torque phase of an upshift. The clutch torques can be decomposed into oncoming and off-going clutch torque levels based on clutch actuator positions or apply forces whose measurements are readably available by pre-calibration.

Figure 2:
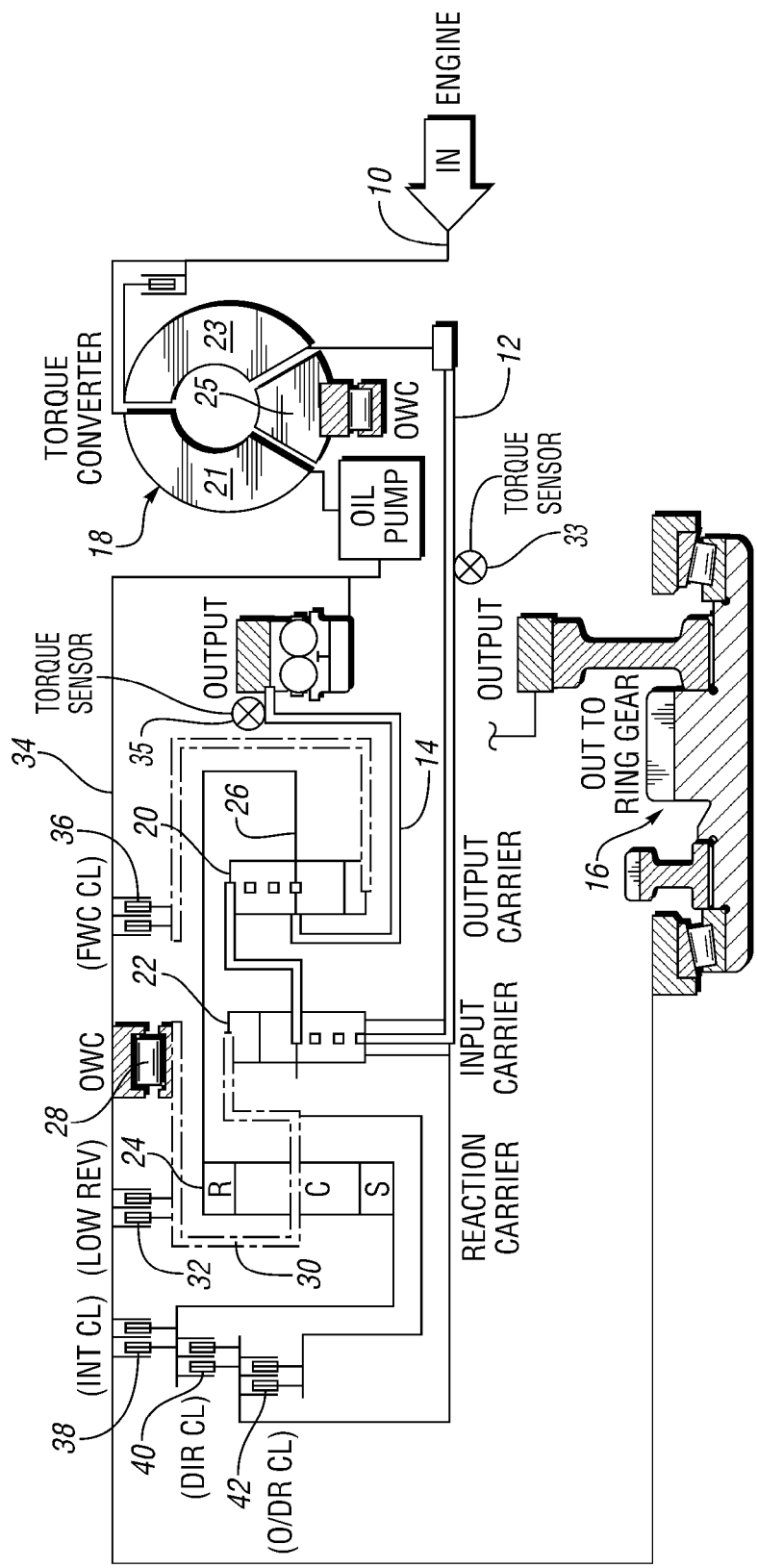
FIG. 2 is an example of a step-ratio planetary automatic transmission, as shown in FIG. 1, wherein the gearing is conditioned for first gear operation.

FIG. 2 shows the transmission in the first gear configuration. Input torque is delivered to the sun gear of gear unit 22 and the ring gear of gear unit 22 acts as a reaction element as reaction torque is delivered to the housing 34 through overrunning coupling 28. Forward coupling 36 is engaged so that the sun gear of gear unit 20 acts as a reaction element. The carrier 26 is the output element, which delivers torque to the output gearing 16 through a cross drive chain, not shown, or torque transfer gearing.

Figure 3:
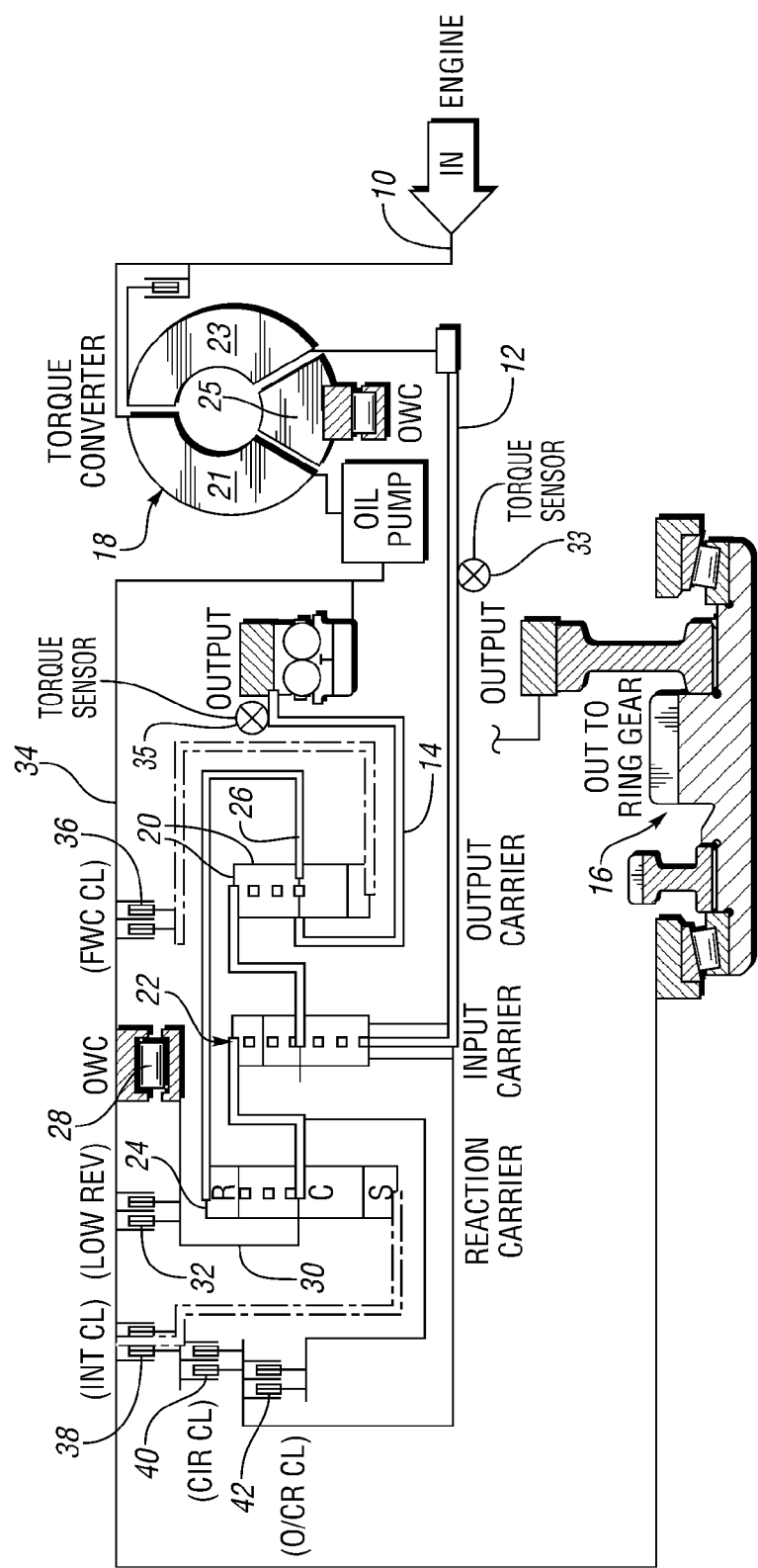
FIG. 3 is an example of a step-ratio planetary automatic transmission, as shown in FIG. 1, with the gearing conditioned for second gear operation.

Second gear configuration is shown in FIG. 3 where the sun gear for gear unit 24 is anchored by the intermediate coupling 38, and the sun gear for gear unit 20 is anchored by the forward coupling brake 36. Input torque from shaft 12 is delivered to the sun gear of gear unit 22. Driving torque then is divided and delivered to the carrier 30 and to the ring gear for gear unit 20, thus driving carrier 26. A torque flow path through gear unit 22 is established as the carrier for gear unit 22 drives a ring gear for gear unit 20. The carrier 26 of the gear unit 20 acts as a torque output member.

Figure 4:
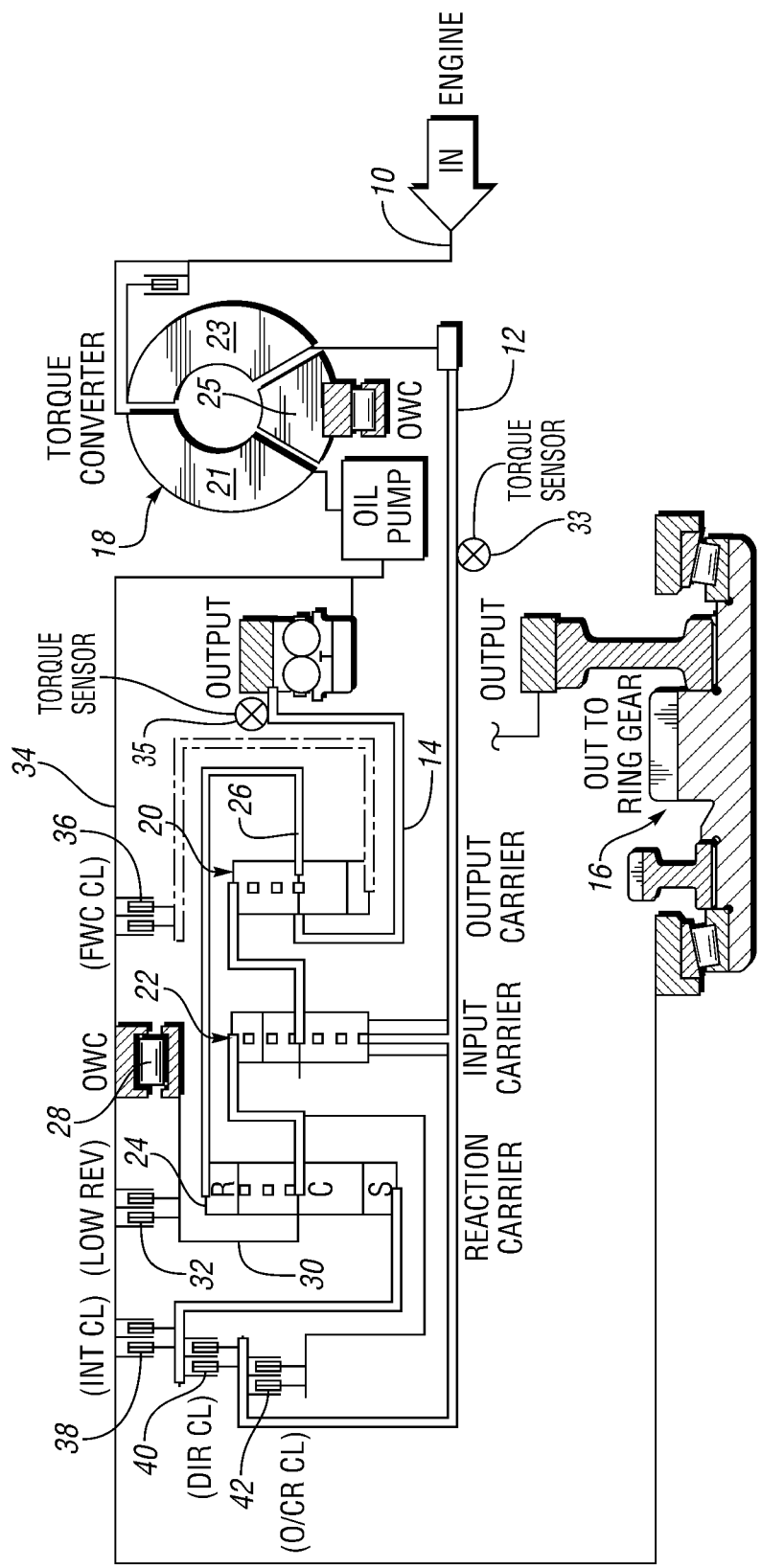
FIG. 4 is an example of a step-ratio planetary automatic transmission, as shown in FIG. 1, in which the gearing is configured for third gear ratio operation.

Third gear configuration is shown in FIG. 4 where input torque from the shaft 12 is delivered through clutch 40 to the sun gear of gear unit 24. The carrier for gear unit 24 drives the ring gear for gear unit 22. The ring gear for gear unit 24 drives the carrier for gear unit 20, which is drivably connected to the torque output gearing 16. Torque input shaft 12 also delivers torque to the sun gear of gear unit 22. The divided torque flow path through gear unit 22 extends to the ring gear for gear unit 20.

An automatic transmission according to an embodiment of the disclosure may be a planetary type as shown in FIGS. 1-3, or a lay shaft type transmission. A speed ratio change occurs in accordance with driving conditions. This is achieved by the friction elements as described above. The friction elements can be plate clutches or band brakes and may be actuated hydraulically, mechanically or through other means.

During a typical automatic transmission upshift event, a friction element or coupling, referred to as an off-going clutch (OGC), disengages while a different friction element or coupling, referred to as an on-coming clutch (OCC) engages in order to lower a speed ratio.

A shift event can be divided into a preparatory phase, a torque phase and an inertia phase. During the preparatory phase, an automatic transmission controller reduces off-going clutch torque capacity to prepare for its release while adjusting the position of an on-coming clutch actuator to prepare for its engagement, as described above.

In the first gear configuration, shown in FIG. 2, the overrunning coupling 28 grounds the carrier for reaction gearing 24 and forward clutch 36 grounds the sun gear for planetary gear set 20. All the other clutches are disengaged. The speed ratio for the input shaft to the output shaft is at its highest value for the transmission. During an upshift event, one or more of the clutches are in the process of being engaged or disengaged as the speed ratio of the input shaft 12 to the output shaft 14 varies between two steady-state ratio values.

In the example shown in FIG. 3, there is a change in the torque flow path through the planetary gear sets. Each component of the gear sets has a different level of torque, causing the various components to accelerate or decelerate. The overrunning coupling 28 will begin to overrun, and when the intermediate clutch 38, after it is fully engaged, will cause a speed ratio of the input shaft 12 to the output shaft 14 to be lower than it was in first gear. This shift requires management of the torque of only a single clutch.

FIG. 4 shows an example of a conventional planetary step ratio transmission in third gear configuration. To change from the second gear ratio (high speed ratio) to the third gear ratio (low speed ratio), the intermediate clutch 38 is disengaged and the direct clutch 40 is engaged. Clutch 38 will be referred to as the off-going clutch and direct clutch 40 will be referred to as the on-coming clutch (OCC). Both clutches must be managed carefully so that the torque being carried by the off-going clutch 38 is transferred to the on-coming clutch 40 in a smooth manner. The swapping of these two clutches causes the sun gear of the reaction planetary gear unit 24 to be connected to the input shaft 12 instead of being grounded against the housing. Ultimately, the intermediate clutch 38 is fully disengaged and the direct clutch 40 is fully engaged. The speed ratio of the input shaft to the output shaft will be lower than it was in second gear. This shift sequence requires careful management of both clutches 38 and 40.

Figure 5:
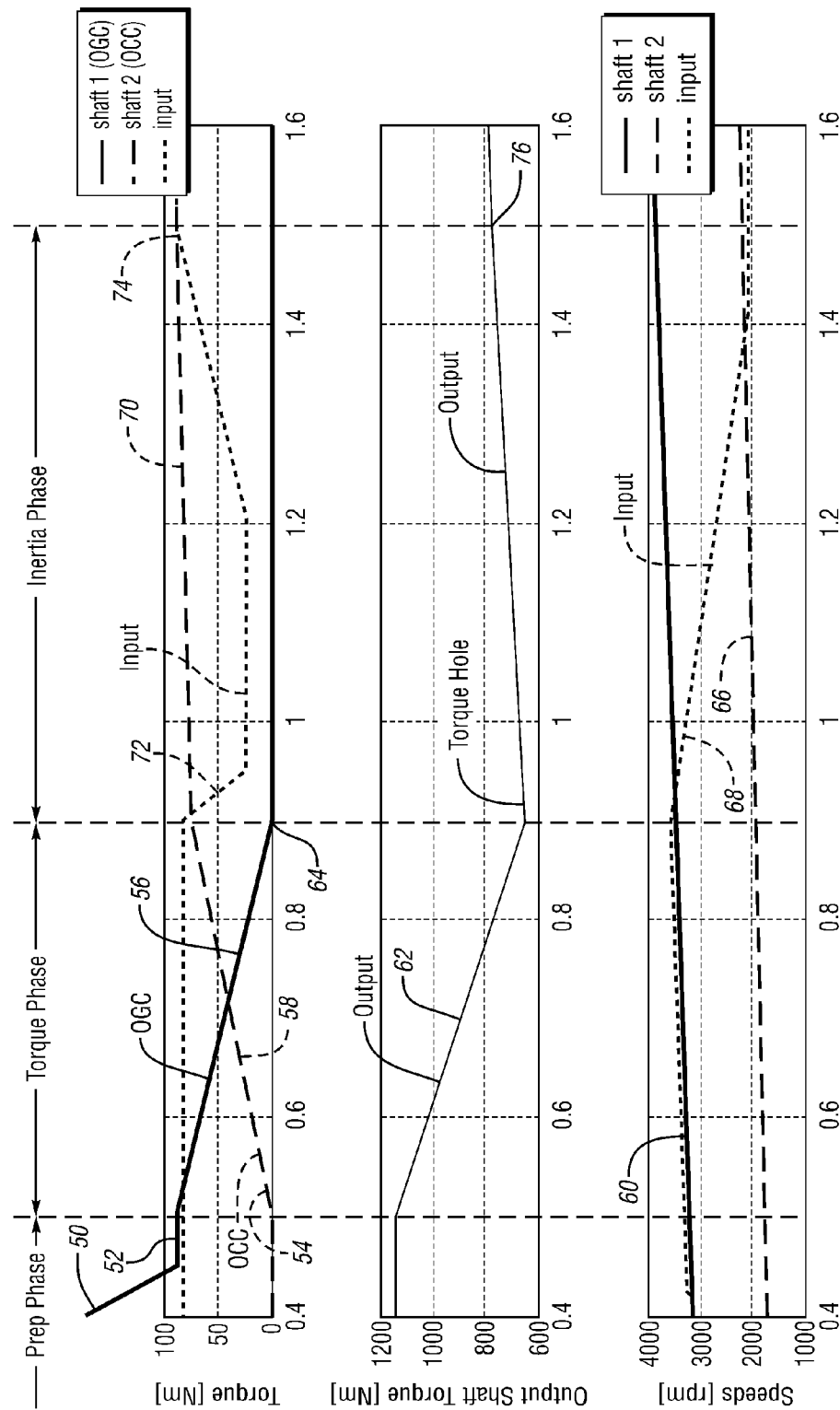
FIG. 5 is an example of a time plot showing the shift characteristics of a synchronous, clutch-to-clutch upshift control for a planetary transmission characterized by a so-called torque hole at the output shaft.

FIG. 5 shows a conventional "power-on" upshift from a low gear configuration to a high gear configuration. The upshift event, diagrammatically illustrated in FIG. 5, is an upshift with an accelerator pedal position greater than zero degrees. The upshift event occurs under a constant engine throttle. This conventional upshift control method is a characteristic of a known planetary type transmission system, as illustrated in FIGS. 1-4, but it could apply also to a lay-shaft type transmission.

The conventional upshift event, illustrated in FIG. 5, is divided into a preparatory phase, a torque phase and an inertia phase. It will be assumed, in a description of the upshift control of FIG. 5, that the upshift is accomplished with two clutches that are controlled synchronously, one clutch releasing from a holding state, which is called the off-going clutch, and one clutch engaging from an open state, called the on-coming clutch. Other transmissions can use other types of friction elements besides clutches, but the principles would be the same.

During the preparatory phase, the torque capacity of the off-going clutch (OGC), is reduced, as shown at 50, to prepare release of the OGC. However, enough OGC torque capacity is maintained to keep the OGC from slipping. A transmission controller adjusts an actuator piston for the clutch pressure operated servo for the on-coming clutch (OCC) to prepare for engagement of the OCC. At the end of the preparatory phase, the on-coming clutch (OCC) is yet to carry significant torque capacity, as shown at 54.

During the torque phase, OGC torque capacity is further reduced, as shown at 56, while the controller increases OCC torque capacity, as shown at 58. The OGC is still securely locked without slipping, which maintains a torque flow path in the low gear configuration. Accordingly, the input shaft speed, as shown at 60, remains the same as that of the output shaft speed multiplied by the gear ratio of the low gear.

The engine speed and the input shaft speed are not necessarily interchangeable because the engine may be connected to the input shaft through a torque converter, thus the term "input shaft speed" may be used in this description rather than engine speed.

If the OGC torque capacity were to be controlled to induce a small slip, the input shaft speed would be higher than that of the output shaft speed multiplied by the gear ratio of the low gear configuration. When OGC slips, it is OGC slip torque capacity for the OGC plot at 56 that drives the downstream gear elements all the way to the output shaft.

During the torque phase, increasing on-coming clutch (OCC) torque capacity reduces the net torque flow through the off-going clutch (OGC) when the off-going clutch remains engaged or locked. Thus, the output shaft torque drops significantly, as shown at 62, creating a so-called torque hole representing a significant, immediate reduction in output shaft torque. A large torque hole can be perceived by a vehicle occupant as sluggish powertrain performance or an unpleasant shift shock.

The inertia phase begins when the off-going clutch (OGC) torque capacity is reduced to a non-significant level, as shown at 64. The on-coming clutch (OCC) carries enough torque capacity, shown at 70, to pull down input speed, as shown at 68, closer to the speed of the output shaft, as shown at 66, multiplied by the ratio of the high gear configuration. The input speed is higher during the torque phase than during the inertia phase, as shown at 60. During the inertia phase, the output shaft torque is primarily affected by the on-coming clutch (OCC) torque capacity at 70.

Also shown in FIG. 5 is a reduced input torque at 72 during the inertia phase. This reduction is achieved by controlling engine spark timing, which is a common practice in conventional shift control strategies. It enables the on-coming clutch (OCC) to engage within a calibration target shift duration without requiring excessive torque capacity.

The shift event is completed when the on-coming clutch (OCC) is fully engaged. The input shaft then is securely coupled to the output shaft through the high gear ratio configuration. Further, the input speed is matched to the output shaft speed multiplied by the gear ratio of the high gear configuration. The input torque reduction at 72 is removed, and the input torque then returns to the level at point 74, which corresponds to the input torque at the beginning of the inertia phase. The output shaft torque returns to the level shown at 76, which corresponds to the input shaft torque level at 74 in the high gear configuration.

Figure 6:
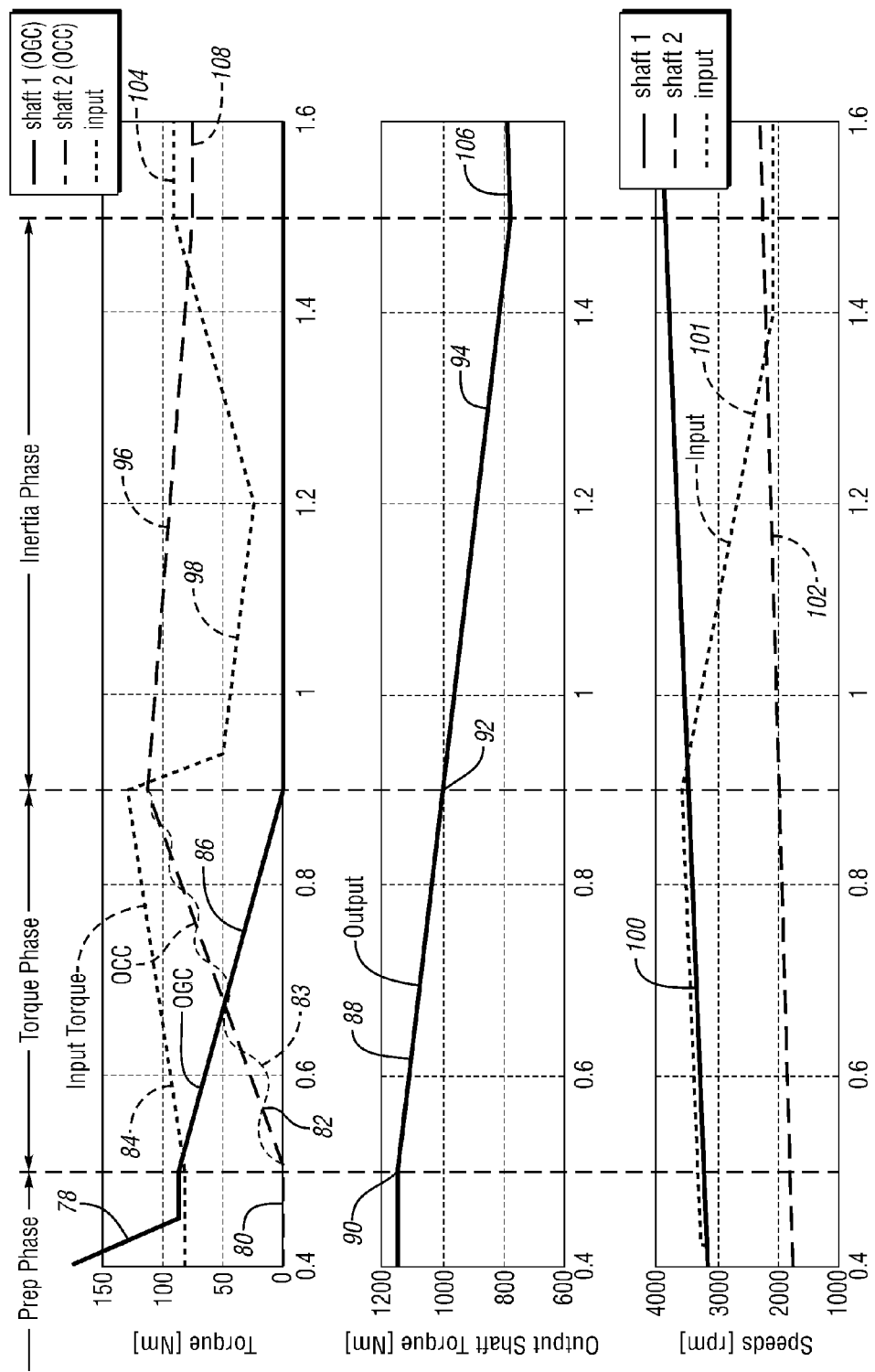
FIG. 6 is an example of a time plot corresponding to FIG. 5 of the shift characteristics for a synchronous upshift control for a planetary transmission, according to an embodiment of the present disclosure.

In contrast to the known upshift control strategy of FIG. 5, FIG. 6 shows an embodiment of an upshift control method according to the present disclosure for a planetary transmission of the kind depicted in FIGS. 1-4. As in the case of FIG. 5, FIG. 6 is divided into a preparatory phase, a torque phase and an inertia phase. During the preparatory phase, a transmission controller 17 reduces the torque of an off-going clutch (OGC), as shown at 78, to prepare for its release. It is usually desired to keep the off-going clutch (OGC) torque above that which would allow it to slip until the OCC has sufficient capacity to carry all the input torque. The controller 17 also adjusts the actuator position for the on-coming clutch (OCC) to prepare for its engagement.

During the torque phase, the controller 17 raises the on-coming clutch (OCC) torque for engagement of the OCC, according to a desired trajectory, shown as trajectory 82. Actuator corrections, achieved by using torque sensor data, may create a wave-form trajectory, as shown at 83. The clutches may be controlled by hydraulic actuators which control the torque of the clutches by applying pressure with the actuators. The corrections help to better match the on-coming clutch torque with the target torque and reduce errors due to unforeseen or uncharacterized variation in the clutch actuator transfer function between the actuator pressure and the clutch torque.

As shown at 84, engine torque is used to fill the torque hole. Therefore, input torque is increased at 84 while the off-going clutch (OGC) torque is further reduced, as shown at 86, while not allowing slip of the OGC. When the off-going clutch (OGC) is locked, torque transmitted from the input shaft to the output shaft is reduced by the on-coming clutch (OCC) torque capacity at 82. Thus, by keeping the off-going clutch (OGC) locked, the transmission controller 17 can actively manage the torque level that drives the output shaft by adjusting only the on-coming clutch (OCC) torque at 82.

The output shaft torque τos can be algebraically described as follows:

$$\tau_{os} = G_{on}\tau_{on} + G_{off}\tau_{off}, \quad (1)$$

where τon is OCC torque capacity as reflected at the transmission gearing input, τoff is OGC torque transmitted (which would be equal to the capacity if clutch is slipping) as reflected at the transmission gearing input, Goff is gear ratio of the low gear, and Gon is gear ratio of the high gear. Equation (1) can be rearranged as:

$$\tau_{on} = \frac{\tau_{os} - G_{off}\tau_{off}}{G_{on}} \quad (2)$$

Rewriting τos as τos,des, Equation (2) can be expressed as:

$$\tau_{on} = \frac{\tau_{os,des} - G_{off}\tau_{off}}{G_{on}}, \quad (3)$$

where τos,des is a desired output shaft torque.

The governing Equation (3) provides a systematic self-calibration of a level of OCC torque capacity τon for achieving a desired output torque profile τos,des while OGC remains locked during the torque phase. More specifically, a torque profile can be specified to smoothly connect the output shaft torque 88 before the start of the torque phase and after the end of the torque phase, thereby eliminating or reducing the torque hole. OGC torque τoff can be estimated based on OGC actuator position or clamping force and the OCC torque capacity can be actively adjusted so that the OGC capacity is higher than the torque transmitted by the OGC until the transmitted torque reaches zero or some low threshold. Thus, for a given τoff, Equation (2) specifies a level of OCC torque capacity τon of the OCC required for achieving a desired output shaft torque at 88. The OGC transmits a part of the input torque 82 through the gear units to the output.

Output shaft torque is described as:

$$\tau_{os} = G_{off}\tau_{in} + (G_{on} - G_{off})\tau_{on}, \quad (4)$$

where τin is the input torque, for example from an engine through a torque converter. Replacing τos with a desired torque profile τos,des, Equation (4) can be rearranged as:

$$\tau_{on} = \frac{\tau_{os,des} - G_{off}\tau_{in}}{G_{on} - G_{off}}, \quad (5)$$

or $$\tau_{in} = \frac{\tau_{os,des} - (G_{on} - G_{off})\tau_{on}}{G_{off}}$$

Torque variables τos and τin can be represented as:

$$\tau_{os,des} = \tau_{os_0} - \Delta\tau_{os} \text{ and } \tau_{in} = \tau_{in_0} + \Delta\tau_{in}, \quad (6)$$

where $\tau_{os_0}$ and $\tau_{in_0}$ are the output shaft torque and input torque at the beginning of the torque phase, respectively. Δτos and Δτin represent the change in output shaft torque and input torque, respectively, at the elapsed time Δt after the torque phase begins. Substituting Equation (6) into Equation (5) yields:

$$\tau_{on} = \frac{\Delta\tau_{os,des} + G_{off}\Delta\tau_{in}}{G_{off} - G_{on}} \quad (7)$$

OCC torque τon can be written as:

$$\tau_{on} = \tau_{on_0} + \Delta\tau_{on}, \quad (8)$$

where $\tau_{on_0}$ is the OCC torque capacity at the beginning of the torque phase and Δτon is the change in OCC torque at Δt. Substituting Equation (8) into Equation (7) results in:

$$\Delta\tau_{on} = \frac{\Delta\tau_{os,des} - G_{off}\Delta\tau_{off}}{G_{on}} \quad (9)$$

where Δτoff=τin−Δτon. Note that Equation (9) takes the same form as the Equation (3), which is the governing equation for determining a level of OCC torque capacity for achieving a desired output torque profile while OGC remains locked.

Therefore, the governing Equations (5), (7) and (9) provide a systematic strategy to self-calibrate a level of OCC torque capacity τon for achieving a desired output torque profile τos, des during the torque phase when OGC remains locked. More specifically, a torque profile τos,des can be specified to smoothly connect output shaft torque 88 between point 90 of the preparatory phase and after point 92 of the torque phase, thereby eliminating or reducing the torque hole.

For a given in at 84, Equation (5) specifies a level of OCC torque capacity τon at 82 required for achieving the target profile τos,des at 88. Alternatively, for given on at 82, Equation (5) may be used to systematically determine a target in at 84 required for achieving τos,des at 88. Once the target level is determined, τin can be controlled by an engine, for example, through a combination of engine throttle control, spark timing control, intake and exhaust valve timing control, turbo boost control or through an auxiliary torque source such as an electric motor. Note that input torque control is coupled to OCC torque control in Equation (5).

The inertia phase begins at 92 when OGC is released. OGC transmits torque only at a non-significant level while OCC carries enough torque capacity, as shown at 96, to slow down input speed, as shown at 101, closer to that of output shaft at 102 multiplied by the ratio of the high gear. Input speed during the torque phase is shown at 100 in FIG. 6. Under this condition, both Equation (3) and Equation (5) can be reduced to:

$$\tau_{on} = \frac{\tau_{os,des}}{G_{on}} \qquad (10)$$

Thus, the output shaft torque τos 94 is primarily affected during the inertia phase by OCC torque capacity τon at 96 during the inertia phase. At this time, OCC torque capacity may be decreased in a controlled manner until the end of the inertia phase. According to the present disclosure, Equation (10) is utilized to provide a target OCC torque capacity τon during the inertia phase that is required to achieve a seamless output shaft torque profile τos,des from the torque phase to the inertia phase. In addition, there is feedback as well as an effect of a change in engine torque.

FIG. 6 shows reduced input torque at 98 during the inertia phase. This is a common practice in a known shift control method. It reduces the inertia torque arising from deceleration of the input shaft during the inertia phase, thus enabling the OCC to engage within a target shift duration without requiring excessive torque capacity. The shift event completes when OCC is fully engaged to securely couple the input shaft to the output shaft through the high gear ratio, matching input speed 101 to output shaft speed 102 multiplied by the ratio of the high gear upon completion of a shift event. The engine torque reduction is removed at 104, and the output shaft torque returns to the level at 106 that corresponds to an input torque level at 108 in the high gear configuration.

Figure 7:
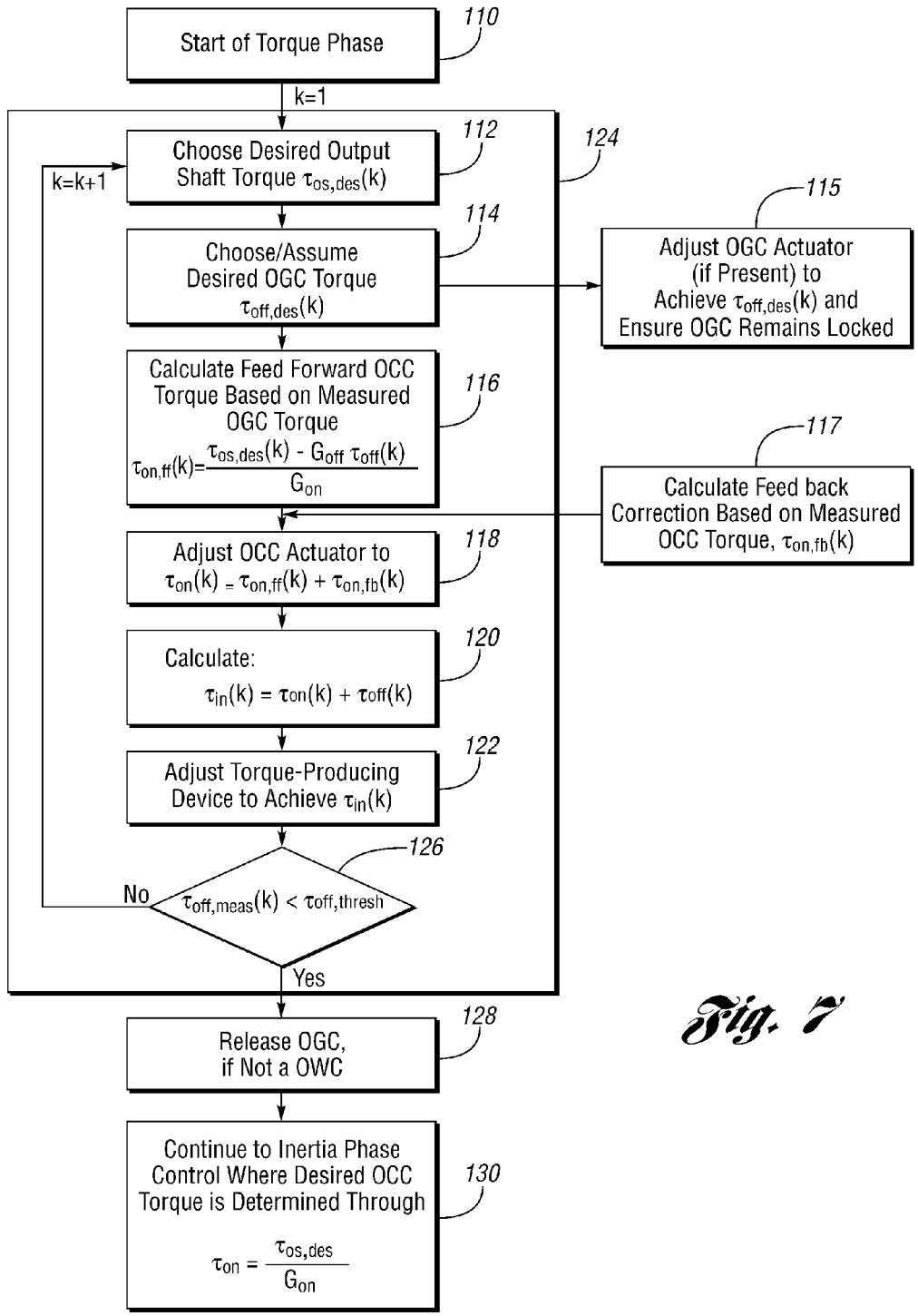
FIG. 7 is a functional flowchart of an upshift control with a locked off-going clutch according to an embodiment of the present disclosure.

FIG. 7 shows a control flow chart of an embodiment of the disclosure when OGC is locked during a torque phase 110. It describes a systematic approach to perform the shift control depicted in FIG. 6. During the torque phase 110, a controller first chooses a desired level of output shaft torque τos,des, as represented by block 112. The controller also chooses (in the case of a clutch) or estimates (in the case of a one-way clutch) the desired OGC torque capacity, as represented by block 114. The OGC actuator is adjusted to ensure that the OGC does not slip, as represented by block 115. If the OGC is a one-way clutch, the torque is determined by OCC torque capacity. If the OGC is a clutch or other friction element, the OGC torque capacity is adjusted through either closed loop control or open loop control of its actuator position or actuator force.

The controller calculates feed forward OCC torque (τon,ff (k)) based on a measurement of off-going clutch (OGC) torque, as represented by block 116. Alternatively, (τon,ff)(k)) can be determined from calculated OGC torque based on torque measurements with torque sensors at other locations, such as an output shaft.

A feedback torque correction, (τon,fb (k)), is calculated, as represented by block 117 based on a measurement of oncoming clutch (OCC) torque. Alternatively, (τon,fb)(k)) can be determined from calculated OCC torque based on torque measurements with torque sensors at other locations, such as an output shaft. The feedback correction, as represented by block 117, may be used to compensate for the inherent variability in the development of clutch torque. The increasing oncoming clutch (OCC) torque, shown at 82 in FIG. 6, for a synchronous clutch-to-clutch upshift is based upon a theoretical model. In actual practice, the response of the clutch actuator to a pressure command is affected by environmental factors. The clutch torque variability may be due to temperature changes, viscosity changes, wear of mechanical elements in the actuator structure, debris, rate of cooling of actuator fluid, or any other unforeseen or uncharacteristic variation, or irregularities in the clutch actuator transfer function.

The controller calculates a feed forward incoming clutch torque, as represented by block 116. The plot, as shown at 83 in FIG. 6, is represented by an irregular dotted line torque correction superimposed over linear line 82. The correction is a feedback term or signal that opposes transient torque disturbances. The correction feedback illustrated by dotted line 83 may be derived from torque sensor measurements, for example. The linear line 82 is a theoretical linear time trace of oncoming clutch pressure (OCC), or any suitable actuating parameter for the given clutch system, corresponding to the time trace shown at 58 in FIG. 5. The control system of the present disclosure will decrease the torque transients so that a resultant oncoming clutch (OCC) pressure trace will resemble more closely the linear line 82 shown in FIG. 6. The oncoming clutch torque correction is based on an actual torque value measured using one or more torque sensors 33, illustrated in FIG. 1. Torque sensor 33 measures input shaft torque and torque sensor 35 measures output shaft torque. The torque sensor measurements can be used if the gear ratio associated with the off-going clutch (Goff) and the gear ratio associated with the oncoming clutch (Gon) are known. A calculation of a feed-forward oncoming clutch (OCC) torque, which is based upon the desired OGC torque, is represented by block 116 in FIG. 7.

The oncoming clutch feedback torque can be calculated also using other sensors, such as an input shaft speed and an output shaft speed. Thus, the oncoming clutch feedback torque can be expressed based on the input shaft torque sensor reading, the output shaft sensor reading, the input shaft speed sensor reading and the output shaft speed sensor reading. Representative equations for accomplishing this are set out in the co-pending patent applications previously described; i.e., application Ser. No. 12/861,387 and Patent Publication 2010/0262344, which are assigned to the assignee of the present application.

The controller uses Equation (3) to self-calibrate the required level of OCC torque capacity, as represented by block 116. Then the controller may adjust the OCC actuator to achieve the desired OCC torque capacity, as represented at 118. Correcting for the difference between the commanded torque in a previous processor control loop (k−1) and the current measurement in the current processor control loop (k) is carried out at 118 in FIG. 7.

Based on the commanded OCC torque capacity and the OGC torque (actual torque transmitted by the off-going clutch as reflected at the transmission gearing input), the controller calculates the input torque needed to maintain the current input speed acceleration, as represented by block 120. The controller then adjusts the torque-producing device (usually an engine) to produce the calculated amount of input torque, as represented by block 122.

The controller evaluates whether the end of the torque phase is reached based upon OGC torque becoming sufficiently small or less than a pre-specified threshold, τoff, thresh, as represented by block 126. If the threshold OGC torque is not reached, or, in other words, the measured OCG torque is still greater than the pre-specified threshold, the controller repeats the control loop 124. The controller re-estimates the desired output shaft torque, as represented by block 112, and chooses (or estimates in case of a non-synchronous shift) OGC torque, as represented by block 114, for the next control time step k+1, and so on. The end of the torque phase is reached when OGC torque becomes sufficiently small or less than a pre-specified threshold τoff,thresh at 126.

When the end of the torque phase is reached, the controller releases OGC, (assuming the OGC is not a one-way clutch), as represented by block 128 and moves to the inertia phase control, as represented by block 130. Equation (10) is utilized to determine a target OCC torque for a seamless output shaft torque transition from the torque phase to the inertia phase, as represented by block 130.

Figure 8:
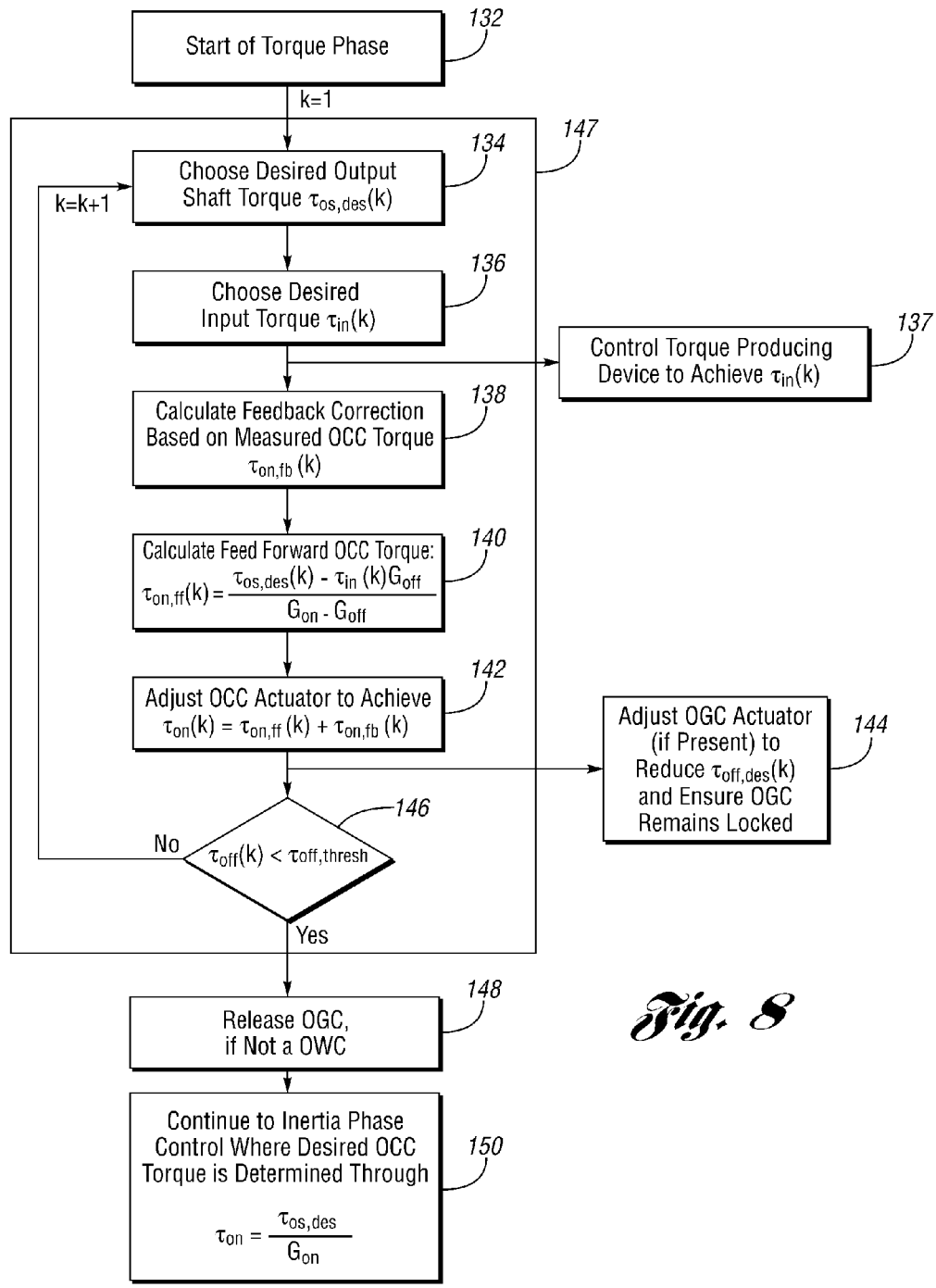
FIG. 8 is a functional flowchart of an upshift control with a locked off-going clutch according to another embodiment of the present disclosure.

FIG. 8 illustrates an alternate embodiment of the present disclosure to reduce or eliminate output shaft torque disturbances previously described. FIG. 8 shows a control flow chart of another embodiment of the synchronous shift control of the disclosure when OGC is locked during a torque phase to enable the shift control depicted in FIG. 6. FIG. 8 illustrates a control strategy that varies from FIG. 7 in that the controller chooses a desired input torque, whereas in FIG. 7, the controller chose a desired OGC torque.

During the torque phase, represented by block 132 in FIG. 8, a controller first chooses a desired level of output shaft torque, as represented by block 134, and also chooses the input torque, as represented by block 136.

The controller brings the input torque to the desired level, as represented by block 137, using any available control parameters. For example, if the torque-producing device is an engine, the controller may bring the input torque to the desired level by controlling a number of variables, including but not limited to: throttle position, spark/ignition timing, intake and exhaust valve timing, turbo boost, etc.

A feedback correction τon,fb(k) based on measured OCC torque (torque sensor output) is determined, as represented by block 138. Alternatively, (τon,fb)(k)) can be determined from calculated OCC torque based on torque measurements with torque sensors at other locations, such as an output shaft, for example. The feedback correction, as represented by block 138, may be used to accommodate the variability in the development of clutch torque, as described above.

Next, the controller calculates a feed forward oncoming clutch torque, as represented by block 140. As described above, the oncoming clutch torque correction is based on an actual torque value measured using one or more torque sensors 33, 35 illustrated in FIG. 1. Torque sensor 33 measures input shaft torque and torque sensor 35 measures output shaft torque. The torque sensor measurements can be used if the gear ratio associated with the off-going clutch (Goff) and the gear ratio associated with the oncoming clutch (Gon) are known. A calculation of a feed-forward oncoming clutch (OCC) torque, which is based upon the desired OGC torque, is represented by block 140 in FIG. 8.

Next, the OCC actuator is adjusted at 230 to achieve τon (k), which is equal to τon,ff(k)+τon,fb(k), as represented by block 142. If the OGC is not a one-way clutch, and if the OGC has an actuator for capacity control, the controller may adjust or reduce OGC torque capacity, as represented by block 144, while ensuring the OGC remains locked without inducing a slip. Alternatively, the controller may not reduce capacity, keeping the OGC locked as the transmitted torque decreases by way of the OCC "picking up" torque.

The controller evaluates whether the end of the torque phase is reached based upon OGC torque level, as represented by block 146. As described above, the controller evaluates whether the end of the torque phase is reached based upon when OGC torque becomes sufficiently small or less than a pre-specified threshold, τoff,thresh, as represented by block 146. If τoff is greater than a calibrated threshold, the control loop 147 is repeated, and the routine will return to the beginning and then repeat in the next control loop k+1. Otherwise, the OGC will be released, as represented by block 148 and moves to the inertia phase control, as represented by block 150. Equation (10) is utilized to determine a target OCC torque for a relatively seamless output shaft torque transition from the torque phase to the inertia phase, as represented by block 150.

Figure 9:
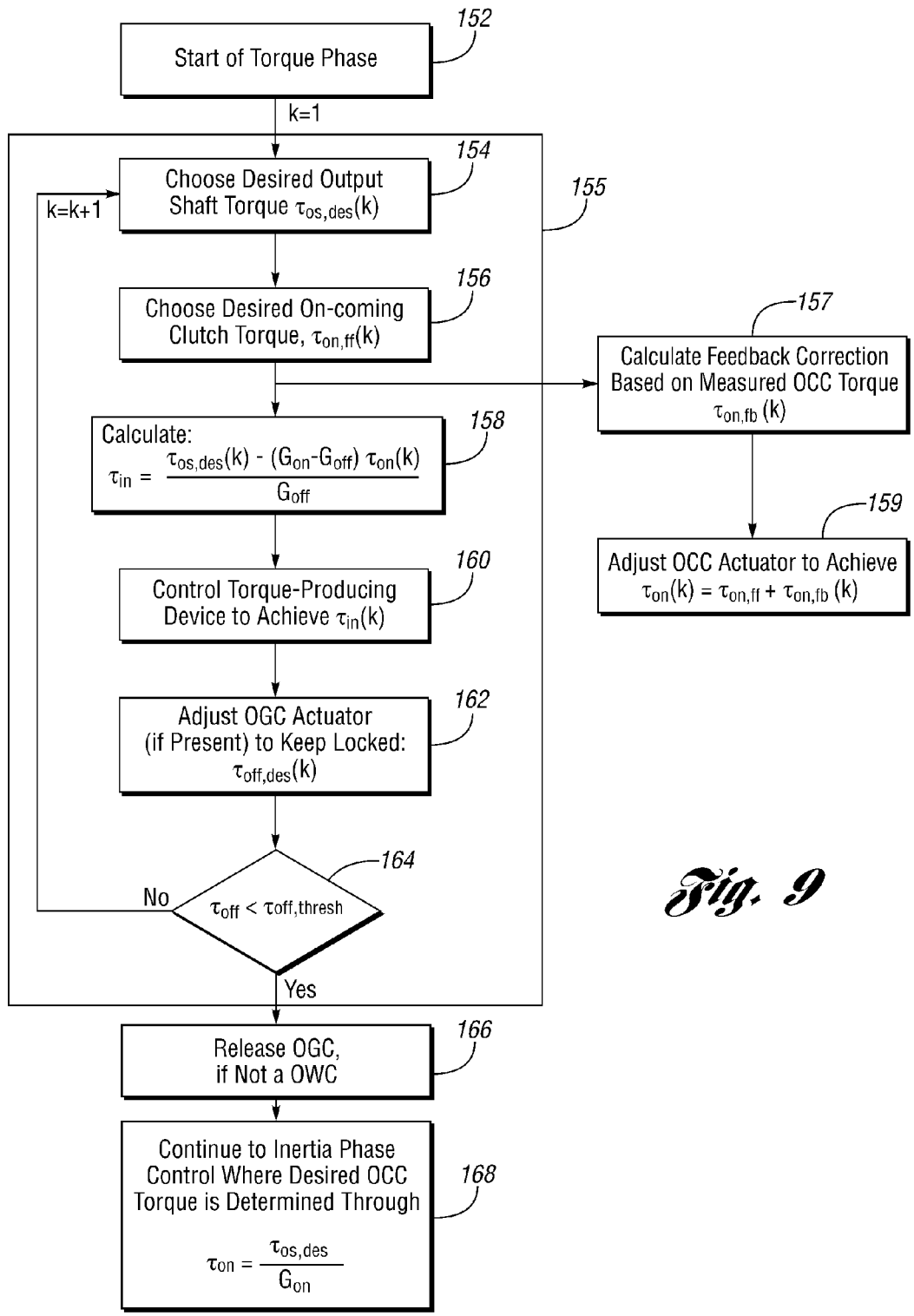
FIG. 9 is a functional flowchart of an upshift control with a locked off-going clutch according to another embodiment of the present disclosure.

FIG. 9 shows a control flow chart for a third possible embodiment of the synchronous shift control of the disclosure when OGC is locked during a torque phase. The control flow chart in FIG. 9 is somewhat similar to flow charts illustrated in FIG. 7 and FIG. 8 except, for example, that a desired target oncoming clutch torque is chosen following the start of the torque phase, represented at block 152. The controller first chooses a desired level of output shaft torque, as represented by block 154. The controller also chooses a desired OCC torque capacity (τon(k)), as represented by block 156.

Next, the OCC feedback correction is made, as represented by block 157. The steps carried out at blocks 157 and 159 in FIG. 9 correspond, respectively, to the steps 138 and 142 described in FIG. 8.

Then the controller utilizes Equation (5), as represented by block 158, to self-calibrate the required level of input torque. Alternatively, Equation (7) or (9) may be utilized, in place of Equation (5), to calculate the required increment of input torque Δτin at the elapsed time Δt after the beginning of the torque phase based on Δτon and Δτos,des.

The controller brings the input torque to the desired level, as represented by block 160, using any available control parameters. If the torque-producing device is an engine, for example, this could include any of the control techniques previously described. If the OGC is not a one-way clutch (OWC) and has an actuator for capacity control, as previously explained with respect to FIG. 8, the controller may reduce OGC torque capacity, as represented at block 162, without inducing a slip. Alternatively, as previously explained with respect to FIG. 8, it may not reduce capacity, keeping the OGC locked as the transmitted torque decreases.

The controller evaluates whether the end of the torque phase is reached based upon OGC torque level using this relationship: τoff(k)<τoff,thresh, as represent by block 164. If τoff(k) is not less than τoff,thresh, the control loop 155 is repeated. The controller then chooses the desired output shaft torque at 154 and the desired OCC torque at 156, etc. for the next control time step k=k+1. The end of the torque phase is reached when OGC torque becomes less than a pre-specified threshold τoff,thresh. The controller releases OGC, as represent by block 166, and moves to the inertia phase control. Equation (10) is used to determine a target OCC torque at 168 for relatively seamless output shaft torque transition from the torque phase to the inertia phase.

In executing the control strategy of the present disclosure, engine torque and input torque to the transmission are controlled accurately so that synchronization is established for clutch engagement and clutch release. At the end of the torque phase, this control will emulate the behavior of a transmission having an overrunning coupling rather than an off-going clutch, which affects a non-synchronous upshift. If the torque transition occurs too soon, the engine will tend to experience an engine speed "flare." If the off-going clutch is released too late, the powertrain will experience a "tie up" of the clutches, which will cause a torque disturbance due to simultaneous engagement of the clutches. With the addition of the torque sensors, the duration of the torque phase may also be decreased as the sensor can give more instant feedback of the clutch torques and reduce the time needed to synchronize the clutch engagement and release. For example, FIG. 6 illustrates the torque phase being approximately 4 milliseconds, however, this time may be decreased.

The initial reduction in the capacity of an off-going clutch during the preparatory phase is made so that excessive off-going clutch capacity is avoided. It is only necessary to maintain an off-going clutch capacity to avoid slipping.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A transmission comprising:
   an input shaft;
   an output shaft;
   a first and second clutch actuated during an upshift between discrete gear ratios, wherein the first clutch is locked during a torque phase of the upshift; and
   an actuator that modulates torque capacity of the second clutch during the torque phase in response to a measured torque of one of the input shaft and the output shaft.

2. The transmission of claim 1 further comprising a planetary gear system.

3. The transmission of claim 1 further comprising:
   a torque sensor positioned to measure torque carried by one of the input shaft and the output shaft and providing a measured torque signal.

4. The transmission of claim 3 further comprising a second torque sensor positioned to measure torque carried by the other one of the input shaft and the output shaft.

5. The transmission of claim 4 wherein the first torque sensor provides the measured torque of the input shaft and the second torque sensor provides the measured torque of the output shaft.

6. The transmission of claim 5 wherein an actual torque value of one of the first and second clutch is determined by a difference between the measured torque of the input shaft and a calculated torque value of one of the first clutch and the second clutch, wherein the calculated torque value is determined from the measured torque of one of the input shaft and the output shaft.

7. The transmission of claim 1 wherein the actuator modulates the torque capacity of the second clutch to provide a substantially linearly decreasing torque of the output shaft during the torque phase and an inertia phase of the upshift.

8. A multiple ratio transmission comprising:
   an input shaft;
   an output shaft;
   an oncoming clutch and off-going clutch for effecting a ratio upshift between discrete gear ratios; and
   a shift controller configured for:
      estimating a target torque for the oncoming clutch during a torque phase of the upshift;
      controlling applying pressure of the off-going clutch so that the off-going clutch remains locked during the torque phase of the upshift;
      adjusting the target torque of the oncoming clutch using a measured torque of a torque transmitting element of the transmission; and
      controlling applying pressure of the oncoming clutch after adjusting.

9. The transmission of claim 8 further comprising a planetary gear system disposed between the input shaft and the output shaft.

10. The transmission of claim 8 wherein the transmission further comprises:
    a first torque sensor positioned to measure torque carried by one of the input shaft and the output shaft and providing a corresponding measured torque signal.

11. The transmission of claim 10 further comprising a second torque sensor, the second torque sensor positioned to measure torque carried by the other one of the input shaft and the output shaft.

12. The transmission of claim 11 wherein the first torque sensor measures a sum of torque input for each of the oncoming clutch and the off-going clutch; and
    the second torque sensor is positioned to measure torque output of one of the oncoming and the off-going clutch, where torque output of the other of the oncoming and off-going clutch is equal to a difference between the torque measured by the first torque sensor and the torque measured by the second torque sensor.

13. The transmission of claim 11 wherein the first torque sensor provides a measured torque signal of the input shaft and the second torque sensor provides a measured torque signal of the output shaft.

14. The transmission of claim 8 wherein the shift controller further calculates an actual torque value of one of the oncoming clutch and the off-going clutch by calculating a difference between the measured input shaft torque and a calculated torque value of one of the oncoming clutch and the off-going clutch.

15. A method for controlling a transmission during an upshift, the method comprising:
    controlling an off-going clutch to remain locked during a torque phase of the upshift;
    measuring an actual torque for a torque transmitting element of the transmission; and
    controlling an oncoming clutch torque capacity in response to the actual torque of the torque transmitting element to provide a generally decreasing output shaft torque during the torque phase and inertia phase of the upshift.

16. The method of claim 15 further comprising calculating a feedback torque of the oncoming clutch in response to the actual torque of the torque transmitting element, wherein the oncoming clutch is controlled based on the feedback torque.

17. The method of claim 16 wherein measuring the actual torque comprises measuring an actual torque of at least one of a transmission input shaft and a transmission output shaft.

18. The method of claim 15 further comprising increasing input torque to the transmission during the torque phase.

19. The method of claim 18 further comprising decreasing input torque to the transmission during a first portion of an inertia phase of the upshift and increasing input torque to the transmission during a second portion of the inertia phase of the upshift.

20. The method of claim 15 wherein controlling the oncoming clutch torque capacity comprises:
    adjusting an estimated oncoming clutch target torque using the actual torque of the torque transmitting element.

* * * * *